US006791616B2

(12) United States Patent
Tamaki et al.

(10) Patent No.: US 6,791,616 B2
(45) Date of Patent: Sep. 14, 2004

(54) IMAGE LENS DISTORTION CORRECTING METHOD

(75) Inventors: Toru Tamaki, Niigata (JP); Tsuyoshi Yamamura, Nagoya (JP); Noboru Ohnishi, Nagoya (JP)

(73) Assignee: Riken, Saitama (JP)

(*) Notice: Subject to any disclaimer, the term of this patent is extended or adjusted under 35 U.S.C. 154(b) by 354 days.

(21) Appl. No.: 09/903,619

(22) Filed: Jul. 13, 2001

(65) Prior Publication Data

US 2002/0057345 A1 May 16, 2002

(30) Foreign Application Priority Data

Sep. 5, 2000 (JP) ........................................ 2000-268652
Feb. 28, 2001 (JP) ........................................ 2001-054686

(51) Int. Cl.[7] ........................ H04N 5/225; H04N 17/00; H04N 1/00; G06K 9/40; G01B 9/00; G01B 11/00
(52) U.S. Cl. .................. 348/335; 348/187; 348/207.99; 382/275; 356/124; 356/394; 358/406
(58) Field of Search ................................ 348/335, 340, 348/175, 187–189, 192, 207.99; 396/91; 382/275; 358/406; 356/124, 394

(56) References Cited

U.S. PATENT DOCUMENTS

| 4,299,482 | A | * | 11/1981 | Task | 356/124 |
| 5,406,375 | A | * | 4/1995 | Brandstetter | 356/124 |
| 5,555,313 | A | * | 9/1996 | Zheng et al. | 382/245 |
| 6,281,931 | B1 | * | 8/2001 | Tsao et al. | 382/275 |
| 6,437,823 | B1 | * | 8/2002 | Zhang | 348/187 |
| 6,573,986 | B2 | * | 6/2003 | Smith et al. | 356/124 |
| 6,618,494 | B1 | * | 9/2003 | Nonay et al. | 382/275 |

FOREIGN PATENT DOCUMENTS

| JP | 02-236433 | * | 9/1990 | G01M/11/02 |
| JP | 08-201021 | * | 8/1996 | G01B/11/00 |
| JP | 10-253499 | * | 9/1998 | G01M/11/02 |
| JP | 11-237216 | * | 8/1999 | G01B/11/16 |
| JP | P2000-3437 A | * | 1/2000 | G06T/1/00 |

OTHER PUBLICATIONS

Pedrick, G., A First Course in Analysis, pp. 160–168, 1994, Springer–Verlag New York, Inc.
Protter, M. H. et al., A First Course in Real Analysis, pp. 332–364, 1977, Springer–Verlag New York, Inc.
Tamaki, T. et al., "Unified Approach to Image Distortion.", Not a Prior Art, 2002.
Microsoft Research, Microsoft Corporation, Technical Report, MSR–TR–97–71, Dec. 2, 1998 (Last Update: Mar. 25, 1999), "A Flexible New Technique for Camera Calibration", Z. Zhang.
IEEE Transactions on Pattern Analysis and Machine Intelligence, vol. 18, No. 8, Aug. 1996, "Compact Representations of Videos Through Dominant and Multiple Motion Estimation", S. Sawhney et al., pp. 814–830.

* cited by examiner

*Primary Examiner*—Andrew Christensen
*Assistant Examiner*—Nhan Tran
(74) *Attorney, Agent, or Firm*—Griffin & Szipl, P.C.

(57) ABSTRACT

An image lens distortion correcting method having step (A) for printing an arbitrary image $I_1$ in a computer; step (B) for photographing the printed image $I_1$ with a camera having a lens distortion and obtaining a photographed image $I_2$ in the computer; step (C) for obtaining a parameter $\theta$ such that the image $I_1$ is artificially distorted with the parameter $\theta$ and an obtained distorted image $I_1^{ud}$ equals with the photographed image $_2$; and step (D) for using the obtained parameter $\theta$ to correct the image photographed by the camera. Thereby, (1) no correspondence point needs to be given, (2) no special tool or object is used, and (3) all points on the image are used, so that an internal parameter can automatically be obtained with high precision, and image lens distortion can be corrected with high precision.

16 Claims, 6 Drawing Sheets

Calibration pattern

Grid pattern

Image before correction    Image after correction

Image before correction    Image after correction

IMAGE LENS DISTORTION CORRECTING METHOD

BACKGROUND OF THE INVENTION

1. Field of the Invention

The present invention relates to a correcting method of lens distortion of an image.

2. Description of Related Art

An image taken by a video camera or a digital camera causes distortion (distortion aberration) depending upon a camera lens. The distortion aberration is generally extreme with a wide angle, increases toward a periphery of the image, and increases to 3% or more particularly with a zoom lens. Moreover, since the image is deformed in a so-called barrel or bobbin shape, this distortion aberration disadvantageously adversely affects estimation in computer vision, measurement using the image, and the like.

Parameters such as a distortion coefficient for determining a camera lens distortion are called a camera internal parameter, and cameral calibration means that the camera internal parameter is obtained. When the camera internal parameter can be obtained through camera calibration, the image lens distortion can be corrected by an image processing using the internal parameter.

A conventional camera calibrating method is disclosed in many research papers.

In the aforementioned conventional method, a relation between a certain point in a three-dimensional space and a point signal to the certain point (correspondence point) in the image is derived, and the internal parameter is estimated. There are two methods of obtaining the correspondence point as follows:

(1) A person designates the correspondence point with a mouse or the like.

(2) A grid intersection point, a polygon or polyhedron apex, or another characteristic point is automatically detected.

Since either one of these methods includes a measurement error, a large number of correspondence points have to be given in order to inhibit an error influence. That is, the more the number of correspondence points is, the more precise the obtained internal parameter becomes. Therefore, correspondence of an enormous number of (several tens to several hundreds) points has to be designated.

Moreover, these methods have the following problems.

In the method (1) in which the person designates the correspondence point with the mouse or the like, the error is large, operation is monotonous, and much labor is necessary. Furthermore, fatigue increases the error during designation.

In the method (2) (characteristic point detecting method) of automatically detecting the characteristic point by the image processing, the number of points detectable by the processing is limited. For example, when the grid intersection point is detected, the number of intersection points is only 88 in total even with 8 longitudinal lines and 11 lateral lines. It is said that at least 200 points or more are necessary for obtaining the parameter with good precision, and it is necessary to prepare the corresponding grid, polyhedron, and the like.

SUMMARY OF THE INVENTION

The present invention has been developed to solve the aforementioned various problems. That is, an object of the present invention is to provide an image lens distortion correcting method in which (1) no correspondence point needs to be given, (2) any special tool or object is not used, and (3) all points on an image are used, so that an internal parameter can automatically be obtained with high precision, and an image lens distortion can be corrected with high precision.

According to the present invention, there is provided an image lens distortion correcting method comprising: an image printing step (A) for printing an arbitrary image $I_1$ in a computer; an image pickup step (B) for taking the printed image $I_1$ with a camera having a lens distortion and obtaining a photographed image $I_2$ in the computer; a parameter estimating step (C) for obtaining a parameter $\theta$ such that the image $I_1$ is artificially distorted with the parameter $\theta$ and an obtained distorted image $I_1^{ud}$ agrees with the photographed image $I_2$; and an image correcting step (D) for using the obtained parameter $\theta$ to correct the image taken by the camera.

According to the aforementioned method of the present invention, first the arbitrary image $I_1$ (Computer graphics, a picture extracted with a scanner, or an image taken by a digital camera) is prepared as a calibration pattern in the computer. Subsequently, the image $I_1$ is printed with a printer having no distortion. The printed image $I_1$ is taken by a camera to be corrected, and the distorted photographed image $I_2$ is obtained. When the certain internal parameter $\theta$ is given, the image $I_1$ can artificially be distorted. When the artificially distorted image $I_1^{ud}$ is compared with the distorted image $I_2$ and the images accurately equal with each other, the given parameter $\theta$ is desirable, and the obtained parameter $\theta$ can be used to correct the camera lens distortion.

According to a preferred embodiment of the present invention, the parameter $\theta$ includes a position correction parameter $\theta''$ for correcting a position, and a distortion correction parameter $\theta^d$ for correcting the distortion.

The position correction parameter $\theta''$ is a parameter for conversion to an image $I_1''$ with the corrected position from the image $I_1$. The conversion parameter is obtained in a least-squares method such that a difference $r=I_1(p)-I_1''(p+u)$ between a luminance value $I_1(p)$ of a point p in the image $I_1$ and a luminance value $I_1''(p+u)$ of a point p+u in the image $I_1''$ corresponding to the point p is minimized entirely on the image. The obtained parameter is used as the position correction parameter $\theta''$.

Moreover, the distortion correction parameter $\theta^d$ is a parameter for conversion to the image $I_i''$ from the distorted image $I_1^{ud}$. The conversion parameter is obtained in the least-squares method such that a difference $r=I_2(p)-I_1''(f(p))$ between a luminance value $I_2(p)$ of the point p in the image $I_2$ and a luminance value $I_1''(f(p))$ of a point f(p) in the image $I_1''$ corresponding to the point p is minimized entirely on the image. The obtained parameter is used as the distortion correction parameter $\theta^d$.

Furthermore, in the image correcting step (D), the obtained distortion correction parameter $\theta^d$ is used to correct the image taken by the camera.

That is, as shown in FIG. 1, a position in the photographed image $I_2$ in which the original image $I_1$ is projected is not known. Therefore, two stages are performed in order to obtain the distorted image $I_1^{ud}$. That is, first the position corrected image $I_1''$ is obtained from the image $I_1$, subsequently the image $I_1''$ is distorted and the distorted image $I_1^{ud}$ is obtained.

First Stage

First, the parameter $\theta^u$ for conversion to the image $I_1^u$ from the image $I_1$ is obtained. This does not include any internal parameter. The point in $I_1^u$ corresponding to the point p in the image $I_1$ deviates by u and is represented by p+u. Here, u changes with p and $\theta^u$. When the image $I_1$ exactly equals with the photographed image $I_2$, the luminance value $I_1(p)$ in p has to be equal to the luminance value $I_2(p+u)$ in p+u. That is, the luminance difference $r=I_1(p)-I_2(p+u)$ in each point has to be 0. An evaluation function $\Sigma r^2$ is obtained by summing squared differences for all the points, and the parameter $\theta^u$ is automatically obtained by repeating calculations such that the evaluation function is minimized.

Second Stage

Subsequently, the parameter $\theta^d$ for conversion to the image $I_1^u$ from the distorted image $I^{1ud}$ is obtained. This is the internal parameter such as a distortion coefficient. This stage is similar to the first stage, but instead of the conversion to the distorted image $I_1^{ud}$ from the image $I_1^u$, a reverse conversion to the image $I_1^u$ from the distorted image $I_1^{ud}$ is considered.

The point in image $I_1^u$ corresponding to the point p in the photographed image $I_2$ is represented by f(p). Here, f( ) changes with p and $\theta^d$.

When the photographed image $I_2$ exactly equals with the image $I_1^u$, the luminance value $I_2(p)$ in p has to be equal to the luminance value $I_1^u(f(p))$ in f(p). That is, the luminance difference $r=I_2(p)-I_1^u(f(p))$ in each point has to be 0. The evaluation function $\Sigma r^2$ is obtained by summing squared differences for all the points, and the parameter $\theta^u$ is automatically obtained by repeating calculations such that the evaluation function is minimized.

Correction

The internal parameter $\theta^d$ used for obtaining the distorted image $I_1^{ud}$ from the image $I_1$ can be used to conversely obtain $I_1$ from $I_1^{ud}$. That is, a processing for correcting the applied distortion can be performed.

When the image $I_2$ taken by the camera is subjected to the same processing as described above, the image with the corrected distortion can be obtained.

In the parameter estimating step (C), it is preferable to alternately repeatedly use the position correction parameter $\theta^u$ and the distortion correction parameter $\theta^d$ and obtain the parameter $\theta$.

Moreover, the parameter $\theta$ is a parameter for conversion to the image $I_1^{ud}$ from the image $I_1$. The conversion parameter is obtained in the least-squares method such that a difference $r=I_1(p)-I_2(d(p+u(p))$ between a luminance value $I_1(p)$ of the point p in the image $I_1$ and a luminance value $I_2(d(p+u(p))$ of a point $d(p+u(p))$ in the image $I_2$ corresponding to the point p is minimized entirely on the image. The obtained parameter is used as the parameter $\theta$.

According to the method, the parameter $\theta$ can be estimated by a single step.

Other objects and advantageous characteristics of the present invention will be apparent from the following description with reference to the accompanying drawings.

DESCRIPTION OF THE PREFERRED EMBODIMENTS

Figure 1:
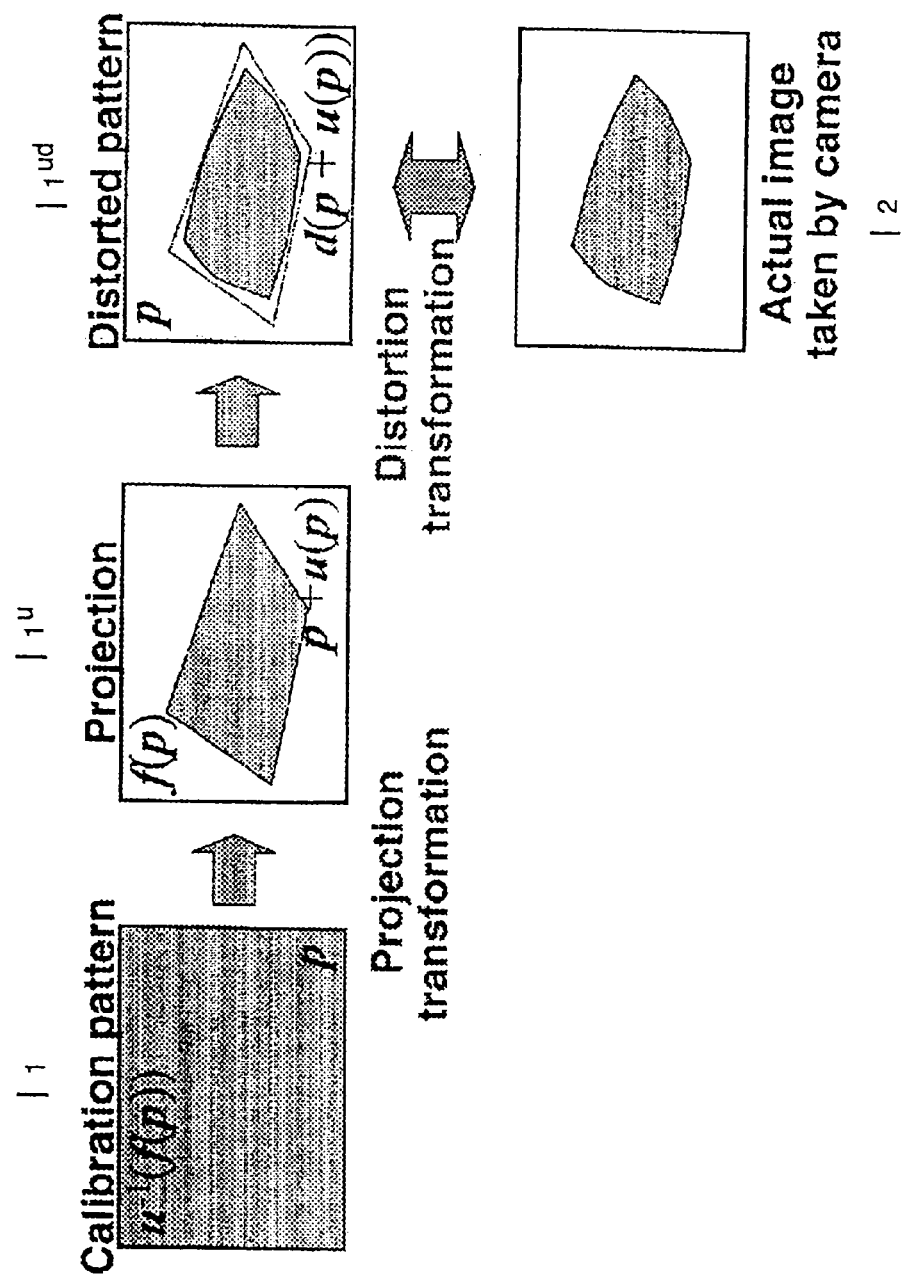
FIG. 1 is a diagram schematically showing a method of the present invention.

A preferred embodiment of the present invention will be described hereinafter with reference to the drawings. Additionally, common portions in the respective drawings are denoted with the same reference numerals, and redundant description is omitted.

Camera calibration and lens distortion correction are important processes in computer vision. In recent years, self calibration has been studied. In many researches, to facilitate the calibration, distortion is not considered and respective problems are formulated. Therefore, it is necessary to calibrate an internal parameter of a camera beforehand.

Some pieces of calibration software have been utilized via Internet (e.g., Tsai's method). However, in such ordinary method, it is necessary to obtain a correspondence between a point on an image and a point on a known three-dimensional coordinate (a plane, or a cube, a model or another structure), and subsequently point conversion is estimated.

In this method, the point correspondence must manually be estimated. Therefore, an error is generated in a manual operation and this lacks in reliability. Additionally, the method requires much time and endurance. Therefore, it is almost impossible to measure a change of a distortion parameter during zoom-in/zoom-out of the camera.

One of alternative methods is detection of a marker. This can be performed by a template matching method to an extend of sub-pixels. However, there is another problem that the marker on the image corresponds to a coordinate in a known space. To improve estimation precision, it is necessary to increase the number of markers, and this problem cannot be ignored. Even if this problem can be avoided, the number of points for the correspondence is still limited.

In the present invention, there is proposed a new correcting method for correcting an image distortion by a lens zoom operation. In the proposed method, the correspondence is set, and the estimation is expected to be more precise than the marker detection. This is because all points of the image are used in the method, instead of using some points of the marker. This method is based on an image registration (superposition) method applied to a motion analysis region, and includes the following three steps, that is, affine transformation, plane projection transformation, and lens distortion restoration.

Three Estimating Steps by Registration

A basic idea is that a correspondence between points is necessary for calibration, and registration can satisfy this requirement. In the proposed method, an ideal calibration pattern is associated with a distorted image obtained by taking the printed pattern with the camera. Since a size of the pattern printed on a sheet can easily be measured, a three-dimensional coordinate of each pixel in the pattern can easily be determined. As other characteristics of the method, any image can be used as the calibration pattern. Moreover, once the parameter is estimated, the parameter can be used as long as the lens zoom operation is unchanged.

The method includes the following three steps. In a first step, the pattern is coarsely transformed into an image represented by an affine parameter and translatory parameter. In a second step, an accurate parameter of plane transformation under through-view projection is estimated by a nonlinear optimizing method. In a third step, a distortion parameter is estimated in order to minimize a residual which remains after application of the second step.

Affine Transformation by Detected Marker

First, a pattern image $I_1$ is prepared. The pattern image has three-color (red, green, blue) markers having coordinates $m_r$, $m_g$, $m_b$ in respective corners. Subsequently, the pattern image $I_1$ is printed in color in order to facilitate detection of the marker.

Therefore, an image $I_2$ of the printed pattern $I_1$ is taken by a camera to be calibrated. Coordinates of markers $m_r'$, $m_g'$, $m_b'$ in the image $I_2$ are detected by thresholding or template matching.

Here, a parameter for transforming the pattern image $I_1$ to the pattern projected in the image $I_2$ is calculated. The transformation is represented by six affine parameters $\theta^\alpha = (\theta^\alpha_1, \ldots \theta^\alpha_6)^T$.

While $p=(x, y)^T$ is set as one point on the pattern $I_1$, $p+a(p;\theta^\alpha)$ is set as one point on $I_2$ corresponding to p. Here, equation (1) of [Equation 1] is established. Subsequently, a linear equation of equation (2) is solved, and parameter $\theta^\alpha$ is obtained.

Equation 1

$$a(p;\theta^\alpha) = \begin{pmatrix} x & y & 0 & 0 & 1 & 0 \\ 0 & 0 & x & y & 0 & 1 \end{pmatrix} \theta^\alpha \qquad (1)$$

$$m'_i = m_i + \alpha(m_i; \theta^\alpha), i=r, g, b \qquad (2)$$

Image Registration; Perspective Fitting

In the first step described above, only three correspondence points are employed with respect to the affine transformation. Subsequently, plane projection transformation is utilized, and accurate correspondence among individual points is set as image registration.

Model and Formulation

Here, a luminance residual between $p_i$ in the image $I_1$ and $p_i+u(p_i; \theta^u)$ in the image $I_2$ corresponding to $p_i$ is minimized. Here, when the residual is defined as in equations (3), (4) of [Equation 2], a function to be minimized is obtained as in equation (5).

Equation 2

$$r_i = I_1(p_i) - I_2(p_i + u(p; \theta^u)) \qquad (3)$$

$$u(p;\theta^u) = \begin{pmatrix} x & y & 0 & 0 & 1 & 0 & x^2 & xy \\ 0 & 0 & x & y & 0 & 1 & xy & y^2 \end{pmatrix} \theta^u$$

$$= M^u \theta^u \qquad (4)$$

$$\min_{\theta^u} \sum_i \rho(r_i)_1 \quad \rho(r_i) = r_i^2 \qquad (5)$$

Here, u( ) denotes displacement of a point on a plane, when a point of view is changed from a certain point to another point under perspective projection. The displacement is a motion model on the plane under the perspective projection, and is represented by eight parameters $\theta^u = (\theta_1^u, \ldots, \theta_8^u)^T$ frequently used in motion analysis.

Minimizing Method

The function (5) is minimized by Gauss-Newton method as a famous nonlinear optimization technique and the parameter $\theta^u$ is estimated. The parameter is updated by equation (6) of [Equation 3].

As an initial value of first six elements of the parameter $\theta^u$, the affine parameter $\theta^\alpha$ obtained in the first stage is used. Last two elements of the parameter $\theta^u$ are initialized/set to 0.

A direction $\delta\theta^u$ in which the function (5) is decreased is calculated by equations (7) to (10).

Equation 3

$$\theta^u \leftarrow \theta^u + \delta\theta^u \qquad (6)$$

$$\delta\theta^u = -(J\tilde{D}J^T)^{-1} J\tilde{D}r \qquad (7)$$

$$J = J(\theta^u) = \frac{\partial r}{\partial \theta^u} = \left[\frac{\partial r_i}{\partial \theta^u_j}\right] \qquad (8)$$

$$\bar{D} = diag\left[\frac{\dot{\rho}(r_i)}{r_i}\right] \qquad (9)$$

$$\dot{\rho}(r_i) = \frac{\partial \rho(r)}{\partial r}\bigg|_{r=r_i} \qquad (10)$$

This is the same as formulation of the least-squares method. That is, the equation is the same as a simultaneous linear equation represented by equation (11) of [Equation 4] for k=1, ..., 8. A differentiating chained law is used to convert a partial derivation as represented by equation (12). The calculation of $\delta\theta^u$ in the equation (6) is repeated until $\delta\theta^u$ converges. In each repetition, the parameter estimated in the previous repetition is used in calculation of u(p). When the repeated calculation stops, the estimated parameter is $\theta^{u'}$, Equation 4

$$\sum_{l,i} \frac{\dot{\rho}(r_i)}{r_i} \frac{\partial r_i}{\partial \theta^u_k} \frac{\partial r_i}{\partial \theta^u_l} \delta\theta^u_l = -\sum_i \frac{\dot{\rho}(r_i)}{r_i} r_i \frac{\partial r_i}{\partial \theta^u_k} \qquad (11)$$

for k = 1, ..., 8.

$$\frac{\partial r}{\partial \theta^u} = \frac{\partial u}{\partial \theta^u} \frac{\partial r}{\partial u} = -M^{uT} \nabla I_2(p + u(p)) \qquad (12)$$

Image Registration; Distortion Fitting

In the previous step, except the influence by the lens distortion, the image registration between the pattern image and the distorted image pattern ends.

Distortion Model

A relation between a coordinate having no distortion is and coordinate having the distortion in a certain image is usually modeled by the following five camera internal parameters, that is, distortion parameters $k_1$ and $k_2$, image center coordinate $(c_x, c_y)^T$ and a ratio $s_x$ of a pixel width to height. These parameters are set to $\theta^d = (k_1, k_2, c_x, c_y, s_x)^T$.

The distortion is represented by a coordinate system having an origin in $(c_x, c_y)^T$. On the other hand, the previously used coordinate system has an origin in an uppermost left corner. Therefore, another notation is introduced as follows.

That is, $P_u = (x_u, y_u)^T$ and $p_d = (x_d, u_d)^T$ are set as points in an image having no distortion and image having the distortion, respectively, and both images have an origin in the left upper corner of the image. Moreover, $(\xi_u, \eta_u)^T$ and $(\xi_d, \eta_d)^T$ are set as points in the image having no distortion and image having the distortion, respectively, in which respective origins are in the image center $(c_x, c_y)^T$. These points can be represented by equations (13) to (15) of [Equation 5].

As described above, $\xi_u$ is represented to be positive as the function of $\xi_d$ but this does not apply to $\xi_d$. In order to obtain $\xi_d$ from $\xi_u$, equation (16) is repeatedly solved.

Equation 5

$$(\xi_u, \eta_u)^T = (x_u, y_u)^T - (c_x, c_y)^T \quad (13)$$

$$(\xi_d, \eta_d)^T = (\xi_u, \eta_u)^T - (\kappa_1 R^2 + \kappa_2 R^4)(\xi_d, \eta_d)^T \quad (14)$$

$$(x_d, y_d)^T = (s_x \xi_d, \eta_d)^T + (c_x, c_y)^T \quad (15)$$

$$R = \sqrt{\xi_d^2 + \eta_d^2}$$

$$(\xi_{dk}, \eta_{dk})^T = \frac{(\xi_u, \eta_u)^T}{1 + \kappa_1 R_{k-1}^2 + \kappa_2 R_{k-1}^4} \quad (16)$$

$$R_k = \sqrt{\xi_{dk}^2 + \eta_{dk}^2},$$

$$R_0 = \sqrt{\xi_u^2 + \eta_u^2}$$

The aforementioned relation is used to obtain two functions between $p_u$ and $p_d$ for the coordinate system having the origin in the uppermost left corner as represented by equations (17) and (18) of [Equation 6]. Here, f and d are mutually inverse functions. However, since d corresponds to the equation (16), d is not a explicit function of $p_u$.

In any case, the equations (17) and (18) can be used to represent transformation between two images. While $I_1^u$ is the image of the pattern transformed by applying $\theta^u$ to $I_1$, $I_1^{ud}$ is the image of the pattern transformed by applying $\theta^d$ to $I_1^u$. That is, the relation is represented by equations (20) to (22). These relations are shown in FIG. 1.

Equation 6

$$P_d = d(p_u; \theta^d) \quad (17)$$

$$p_u = f(p_d; \theta^d) \quad (18)$$
$$= \begin{pmatrix} \frac{x_d - c_r}{s_r}(1 + \kappa_1 R'^2 + \kappa_2 R'^4) + c_x \\ (y_d - c_y)(1 + \kappa_1 R'^2 + \kappa_2 R'^4) + c_y \end{pmatrix}$$

$$R' = \sqrt{\left(\frac{x_d - c_r}{s_r}\right)^2 + (y_d - c_y)^2} \quad (19)$$

$$I_i(p) = I_i^u(p + u(p; \theta^u)) \quad (20)$$

$$I_1^u(p) = I_1^{ud}(d(p)) \quad (21)$$

$$I_i^u(f(p)) = i_1^{ud}(p) \quad (22)$$

Minimization by Reverse Registration

The transformation to the image $I_1^{ud}$ from $I_1$ is represented by u and d. However, since d is not the explicit function, the parameter between $I_1$ and $I_1^{ud}$ cannot directly be estimated by registration.

Here, reverse registration is considered. As shown in FIG. 1, the image $I_2$ is matched with $I_1^{ud}$. That is, the residual of luminance between two images represented by equation (23) of [Equation 7] is minimized.

However, this equation can be represented by equation (24) using equation (22). Then, an estimating method is the same as that of the previous step. The minimization is performed on the function of equation (25) by the Gauss-Newton method.

Here, $\Omega = \{i; p_i \in I_2, \exists p \in I_1, f(p_i) = p + u(p)\}$ means that the minimization has to be applied to the point inside the region corresponding to the pattern $I_1$ among points in $I_2$.

Equation 7

$$r_i = I_1^{ud}(p_i) - I_2(p_i) \quad (23)$$

$$r_i = I_2(p_i) - I_1^u(f(p_i; \theta^d)) \quad (24)$$

$$\min_{\theta^d} \sum_{\Omega} \rho(r_i) \quad (25)$$

$$\Omega = \{i; p_i \in I_2, \exists p \in I_1, f(p_i) = p + u(p)\}$$

The simultaneous linear equation in which solution needs to be found has the same form as that of the equation (11), and is represented by equation (26) of [Equation 8]. The derivation in the equation (26) is represented by equation (27).

Equation 8

$$\sum_{l, i \in \Omega} \frac{\dot{\rho}(r_i)}{r_i} \frac{\partial r_i}{\partial \theta_k^d} \frac{\partial r_i}{\partial \theta_l^d} \delta \theta_l^d = -\sum_{i \in \Omega} \frac{\dot{\rho}(r_i)}{r_i} r_i \frac{\partial r_i}{\partial \theta_k^d} \quad (26)$$

$$\frac{\partial r}{\partial \theta^d} = \frac{\partial f}{\partial \theta^d} \frac{\partial r}{\partial f} = \frac{\partial f}{\partial \theta^d}(-\nabla I_1^u(f(p))) \quad (27)$$

Jacobian matrix of the equation (18) is represented by equations (28) to (34) of [Equation 9].

Initial parameters $c^x$, $c_y$, $k_2$ and $s_x$ for solving the equation (26) are set to ½ of width and height of $I_2$, 0 and 1, respectively. On the other hand, in all of equations (29) to (32), $k_1$ is arbitrarily initially set to avoid 0 by initial setting of $k_1 = k_2 = 0$. Here, $k_1 \in [-10^{-7}, 10^{-7}]$ is empirically selected.

Equation 9

$$\frac{\partial f(p_d)}{\partial \theta^d} = \begin{pmatrix} R'^2 x_d - \frac{c_r}{s_r} & R'^2(y_d - c_y) \\ R'^4 x_d - \frac{c_r}{s_r} & R'^4(y_d - c_y) \\ \frac{\partial x_y}{\partial c_r} & \frac{\partial y_u}{\partial c_r} \\ \frac{\partial x_u}{\partial c_y} & \frac{\partial y_u}{\partial c_y} \\ \frac{\partial x_u}{\partial s_r} & \frac{\partial y_u}{\partial s_r} \end{pmatrix} \quad (28)$$

$$\frac{\partial x_u}{\partial c_x} = 1 - \frac{1}{s_x}(1 + \kappa_1 R'^2 + \kappa_2 R'^4) \quad (29)$$
$$-2(\kappa_1 + 2\kappa_2 R'^2)\frac{(x_d - c_x)^2}{s_x^3}$$

$$\frac{\partial y_u}{\partial c_x} = -2(\kappa_1 + 2\kappa_2 R'^2)\frac{x_d - c_x}{s_x^2}(y_d - c_y) \quad (30)$$

$$\frac{\partial x_u}{\partial c_y} = -2(\kappa_1 + 2\kappa_2 R'^2)\frac{x_d - c_x}{s_x}(y_d - c_y) \quad (31)$$

$$\frac{\partial y_u}{\partial c_y} = 1 - (1 + \kappa_1 R'^2 + \kappa_2 R'^4) \quad (32)$$
$$-2(y_d - c_y)^2(\kappa_1 + 2\kappa_2 R'^2)$$

$$\frac{\partial x_u}{\partial s_x} = \frac{-(x_d - c_x)}{s_x^2}(1 + \kappa_1 R'^2 + \kappa_2 R'^4) \quad (33)$$
$$-2(\kappa_1 + 2\kappa_2 R'^2)\frac{(x_d - c_x)^3}{s_x^4}$$

$$\frac{\partial y_u}{\partial s_x} = -2(y_d - c_y)(\kappa_1 + 2\kappa_2 R'^2)\frac{(x_d - c_x)^2}{s_x^3} \quad (34)$$

Repetition of Two Steps

Figure 5:
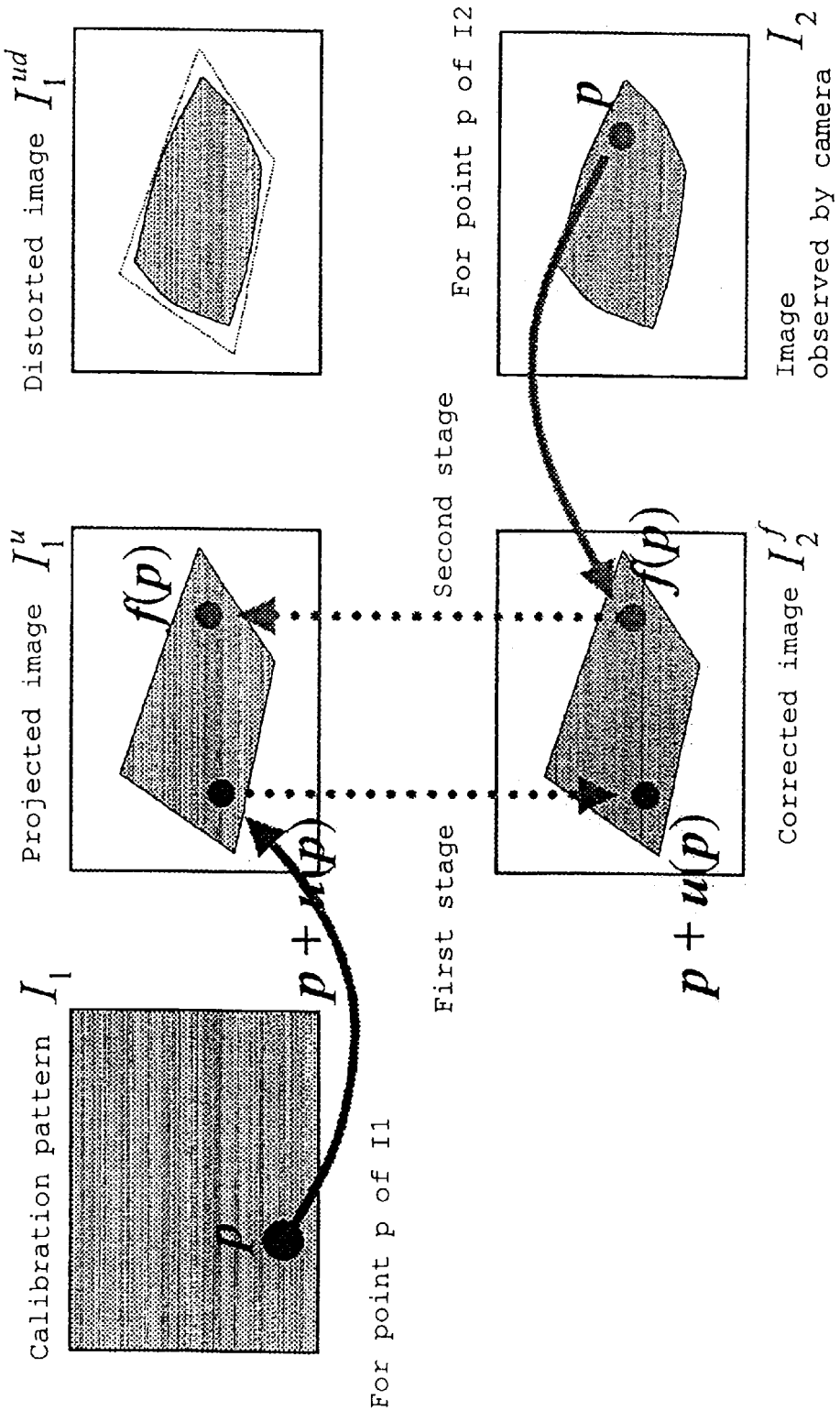
FIG. 5 is a schematic diagram of a method of repeating two steps.

FIG. 5 is a schematic diagram showing a method of repeating two steps. Even when there is a relatively large residual in an initial state, a strategy for shifting to a fine resolution from a coarse resolution (coarse-to-fine) is employed in order to shorten a calculation time and perform precise estimation. That is, first a filtered and blurred image is processed, a filter is gradually changed to a filter having a smaller blur, and a cleared image is processed. Therefore, while the resolutions of $I_1$, $I_1''$, $I_2$ are changed to the fine resolution from the coarse resolution, second and third steps are alternately repeated (see FIG. 5).

Therefore, the estimation of the second step has to be corrected to include an estimated value $\theta^d$ of the third step.

Here, $I_2^f$ is assumed to be an image obtained by correcting distortion of the photographed image $I_2$ through transformation f using the parameter $\theta^d$. That is, the image can be represented by equations (35), (36).

This is used to correct the equation (3) of the residual as represented by equation (37).

In this case, Jacobian equation (12) turns to equation (38).

The corrected second step, and the third step are alternately repeated until the estimated value converges.

The image having no distortion can be obtained from the photographed image by the transformation f using the parameter $\theta^d$ out of the obtained parameters.

Equation 10

$$I_2^f(f(p; \theta^d); \theta^d) = I_2(p) \tag{35}$$

$$I_2^f(p; \theta^d) = I_2(d(p; \theta^d)) \tag{36}$$

$$r_i = I_1(p_i) - I_2^f(p_i + u(p_i; \theta^u); \theta^d) \tag{37}$$

$$\frac{\partial r}{\partial \theta^u} = -M^{uT} \nabla I_2^f(p + u(p; \theta^u); \theta^d) \tag{38}$$

Estimation with One Step

Figure 6:
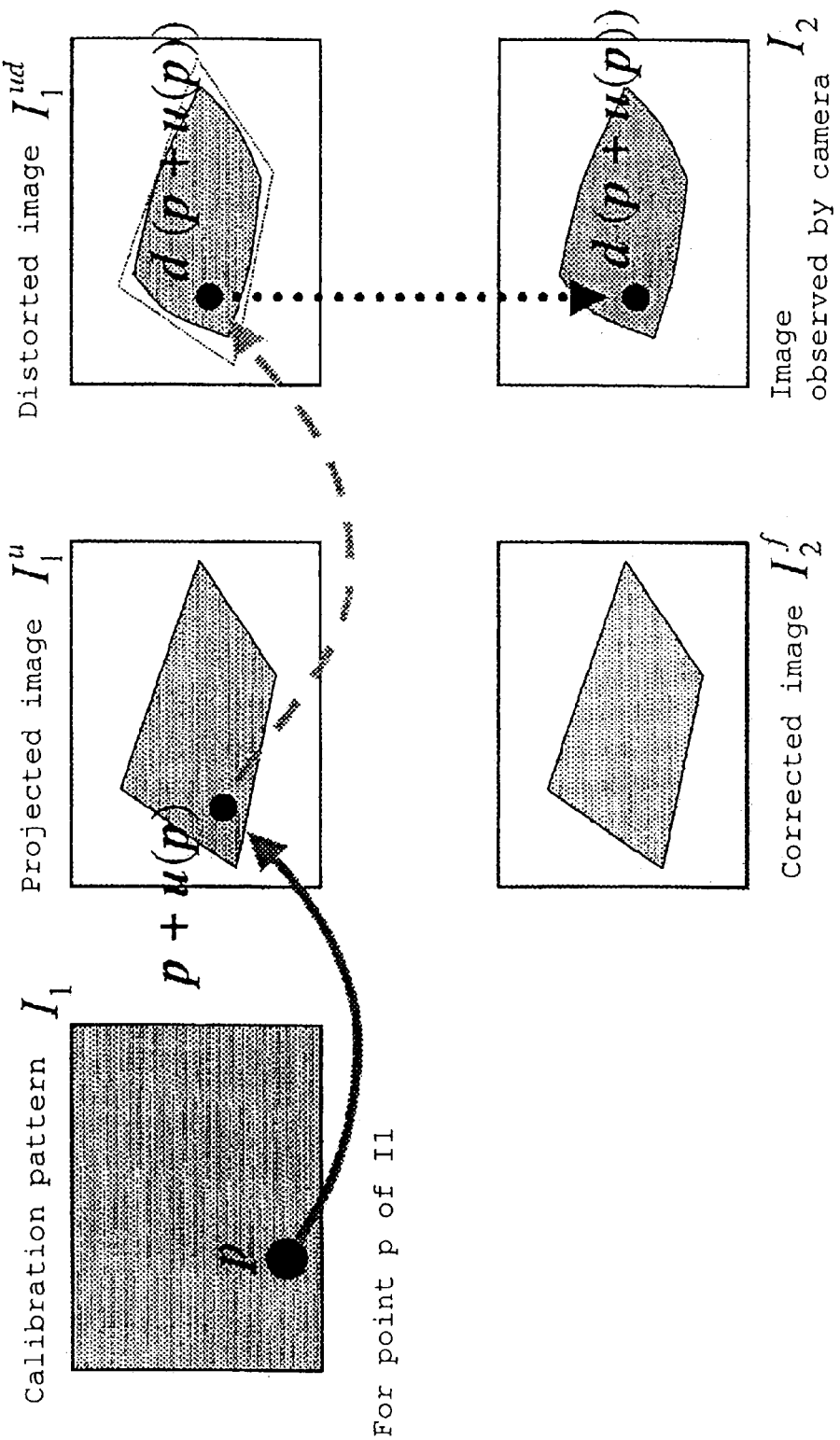
FIG. 6 is a schematic diagram of an estimating method with one step.

FIG. 6 is a schematic diagram showing an estimating method with one step. The estimation by the repetition of two steps has been described above, but these two steps can be unified into one estimating step.

Since d is not the explicit function, that is, d is an implicit function unable to be represented by any equation, a function obtained by synthesizing u and d also becomes implicit function. This synthesized function u·d transforms the image $I_1$ to $I_1^{ud}$. Therefore, the parameter $\theta^u$, $\theta^d$ may be obtained such that $I^{ud}$ accurately equals with $I_2$. In this case, Jacobian of the synthesized function needs to be explicit, and the explicit function is obtained from Jacobian of u and d.

In actual, since d is an implicit function, Jacobian cannot be obtained by directly differentiating the equation. However, when the implicit function theorem known in a mathematical field is used, Jacobian of d can be obtained as the explicit function.

Here, it is assumed that $p_u$ and $\theta^d$ are unified into one, and represented by $q=(p_u, \theta^d)$ Then, function F of equation (39) as the function of q is considered.

In this case, d is an implicit function defined by $p_d=d(q)$. Therefore, Jacobian of d can be calculated by the implicit function theorem as represented by equations (40) and (41).

Here, $E_2$ is a 2×2 unit matrix, and represented by equation (41a). Moreover, $\partial f/\partial \theta^d$ is the same as the equation (28). Moreover, $\partial f/\partial p_d$ can be calculated from the equation (18), and is actually represented by equations (42) and (43) using the equations (29) to (32).

Equation 11

$$F(q, p_d) = p_u - f(p_d, \theta^d) = 0 \tag{39}$$

$$\frac{\partial d}{\partial q} = -\frac{\partial F^{-1}}{\partial p_d} \frac{\partial F}{\partial q} \tag{40}$$

$$= -\frac{\partial f^{-1}}{\partial p_d} \left( -E_2 \frac{\partial f}{\partial \theta^d} \right) \tag{41}$$

$$E_2 = \begin{pmatrix} 1 & 0 \\ 0 & 1 \end{pmatrix} \tag{41a}$$

$$\frac{\partial f}{\partial p_d} = \begin{pmatrix} \frac{\partial x_u}{\partial x_d} & \frac{\partial y_u}{\partial x_d} \\ \frac{\partial x_u}{\partial y_d} & \frac{\partial y_u}{\partial y_d} \end{pmatrix} \tag{42}$$

$$= \begin{pmatrix} 1 - \frac{\partial x_u}{\partial c_x} & -\frac{\partial y_u}{\partial c_x} \\ -\frac{\partial x_u}{\partial c_y} & 1 - \frac{\partial y_u}{\partial c_y} \end{pmatrix} \tag{43}$$

As described above, Jacobian of the function obtained by synthesizing transformations u, d can be calculated. A squared sum of luminance differences from the point in the photographed image $I_2$ corresponding to the point $p_i$ in the pattern $I_1$, and is represented by equations (44), (45).

Parameter $\theta = \{\theta^u, \theta^d\}$ for minimizing the squared sum is estimated (see FIG. 6). The optimizing method for the estimation is performed similarly as the estimation of the second and third steps. That is, the simultaneous linear equation to be solved is represented by equation (46).

Here, partial differential $\partial r_i/\partial \theta_k$ is derived as an element of Jacobian of equations (47) to (52).

Here, $p_d = d(p_u)$, $p_u = p + u(p)$ Moreover, $E_5$ is a 5×5 unit matrix.

The image having no distortion can be obtained from the photographed image by the transformation f using the parameter $\theta^d$ out of the obtained parameters.

Equation 12

$$r_i = I_1(p_i) - I_2(d(p_i + u(p_i; \theta^u)); \theta^d) \tag{44}$$

$$\min_{\theta^u} \sum_i \rho(r_i), \; \rho(r_i) = r_i^2 \tag{45}$$

$$\sum_l \sum_i \frac{\dot{\rho}(r_i)}{r_i} \frac{\partial r_i}{\partial \theta_k} \frac{\partial r_i}{\partial \theta_l} \delta \theta_l = -\sum_i \frac{\dot{\rho}(r_i)}{r_i} r_i \frac{\partial r_i}{\partial \theta_k} \tag{46}$$

$$\frac{\partial r}{\partial \theta} = \frac{\partial r}{\partial q} \frac{\partial q}{\partial \theta} \tag{47}$$

$$= \frac{\partial r}{\partial d} \frac{\partial d}{\partial q} \left( \frac{\partial q}{\partial \theta^u} \; \frac{\partial q}{\partial \theta^d} \right) \tag{48}$$

$$= \frac{\partial r}{\partial d} \frac{\partial d}{\partial q} \begin{pmatrix} \frac{\partial p_u}{\partial \theta^u} & \frac{\partial p_u}{\partial \theta^d} \\ \frac{\partial \theta^d}{\partial \theta^u} & \frac{\partial \theta^d}{\partial \theta^d} \end{pmatrix} \tag{49}$$

$$= \frac{\partial r}{\partial d} \frac{\partial d}{\partial q} \begin{pmatrix} \frac{\partial p_u}{\partial \theta^u} & 0 \\ 0 & E_5 \end{pmatrix} \tag{50}$$

$$= -\nabla I_2(d(p_u)) \frac{\partial d}{\partial q} \begin{pmatrix} M^u & 0 \\ 0 & E_5 \end{pmatrix} \tag{51}$$

-continued $$= \nabla I_2(d(p_u)) \frac{\partial f^{-1}}{\partial p_d} \left( -M^u \quad \frac{\partial f}{\partial \theta^d} \right) \quad (52)$$

Several Strategies
(1) Interpolation of Pixel Value

When the luminance of the point having no coordinate on an integer grid is necessary, bilinear interpolation is applied between adjacent pixel values.

(2) Histogram Matching

For the image taken by the camera, since pattern luminance often changes, image histogram is converted so that the histogram of the image becomes the same as that of the pattern.

EXAMPLES

Figure 2:
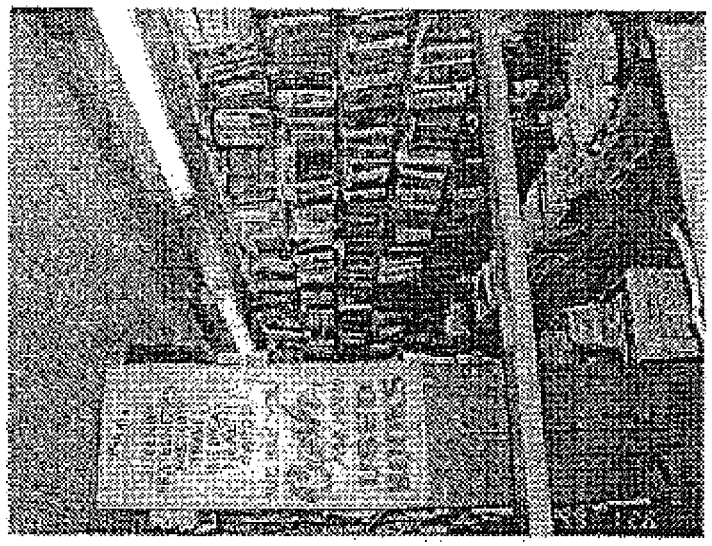
FIG. 2 shows a halftone image displayed on a display in a calibration pattern used in an embodiment.
Figure 2:
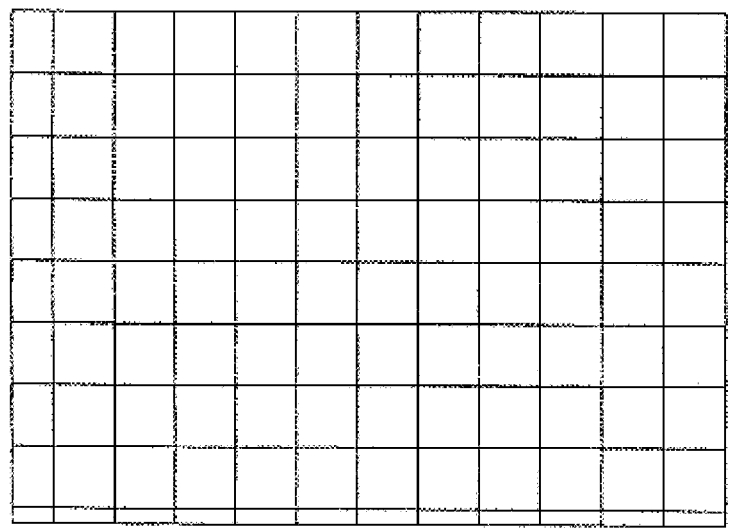

While the camera zoom parameter was changed, an experiment was performed for the actual image taken by the camera in the proposed method. A picture shown in FIG. 2 was used as the calibration pattern printed by a laser printer (EPSON LP-9200PS2), and an image of the picture was taken by a CCD camera (Sony EVI-D30) fixed on a support with image taking software (SGI O2). While the camera zoom was changed from a widest angle, two images of grid and calibration patterns were photographed. The wider the angle is, the more the distortion influence increases. Then, a grid line is curved.

An estimation result of the internal parameter according to the present invention is shown in Table 1. Moreover, this internal parameter is used to show images before and after the correction in FIG. 3 and FIG. 4. It is seen that the curved line in the grid pattern is transformed into a straight line by the correction.

TABLE 1

Figure 3:
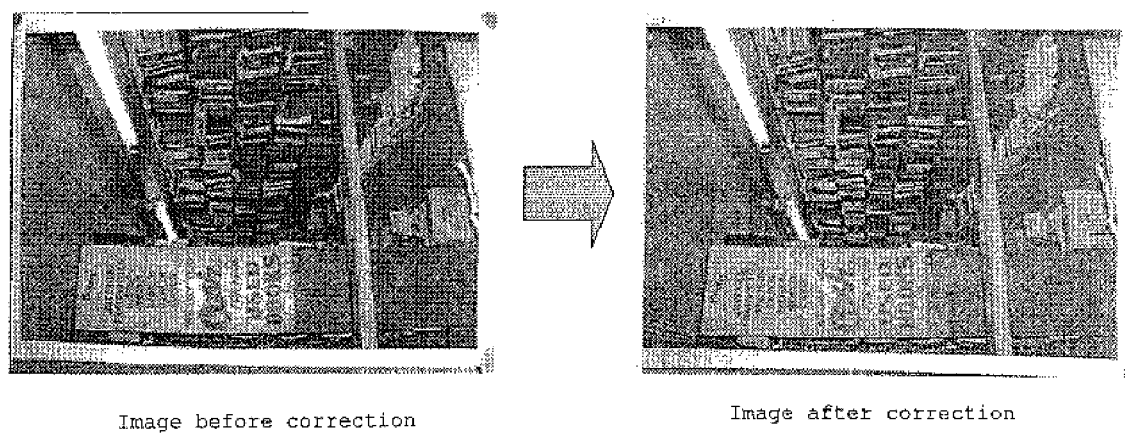
FIG. 3 shows the halftone image displayed on the display before and after correction according to the method of the present invention.
Figure 4:
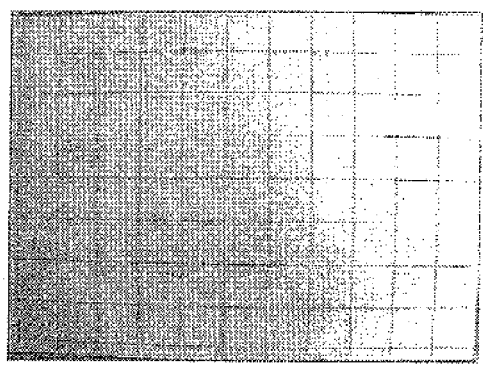
FIG. 4 shows another halftone image displayed on the display before and after the correction according to the method of the present invention.
Figure 4:
Figure 4:
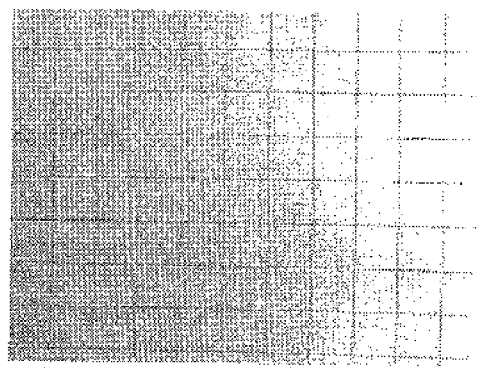

|       | FIG. 3 (a) | FIG. 3 (e) |
|-------|------------|------------|
| $k_1$ | 2.804e-07  | -6.7631e-08 |
| $k_2$ | 2.992e-13  | 5.219e-13  |
| $c_x$ | 327.8      | 326.6      |
| $c_y$ | 214.3      | 184.2      |
| $s_x$ | 0.9954     | 0.9997     |

A gradation change of an image illuminance cannot be removed by a simple histogram conversion which is to be replaced with the estimation of the illuminance change by some methods such as linear luminance restriction. Therefore, the grid line is still slightly curved particularly in a peripheral portion of the image, and as shown on the right side of FIG. 3, there is a slight error in the experiment result.

In an experiment simulation in which a noise was added to each pixel of the transformed pattern and the pattern was used as the distorted image, the proposed method satisfactorily functioned even with a uniform amplitude of added noise of ±50 or more.

As described above, in the present invention, there is proposed an inventive method for obtaining the internal parameter of the camera to correct the image distortion. The proposed method is based on the image registration, and includes two nonlinear optimizing steps of perspective fitting and distortion fitting by geometric transformation. The experiment result has proved an efficiency of the present proposed method which can reduce an operator's labor. The nonlinear optimization requires time, but the technique is sufficiently effective as a batch process.

As described above, there is proposed an inventive image lens distortion correcting method for obtaining the camera internal parameter to correct the distortion of the image taken by the camera with the zoom lens attached thereto. This method is based on image registration. First, a certain calibration pattern is transformed into the distorted image pattern using affine transformation. Subsequently, the non-linear optimization of Gauss-Newton method for minimizing the luminance difference of pixel values of two images is applied, and the two images are registered. Finally, the distortion parameter is estimated to minimize the luminance difference remaining after the second step. The experiment result shows effectiveness of the proposed method.

Therefore, in the image lens distortion correcting method of the present invention, (1) no correspondence point needs to be given, (2) any special tool or object is not used, and (3) all points on the image are used, so that the internal parameter can automatically be obtained with high precision, the image lens distortion can be corrected with high precision, and other superior effects are produced.

Additionally, the present invention is not limited to the aforementioned embodiment, and can of course variously be changed within the scope of the present invention.

What is claimed is:

1. An image lens distortion correcting method comprising:

an image printing step (A) for printing a prepared calibration pattern image $I_1$ in a computer;

an image pickup step (B) for photographing the printed image $I_1$ with a camera having a lens distortion and obtaining a photographed image $I_2$ in the computer;

a parameter estimating step (C) for obtaining a parameter $\theta$ such that the image $I_1$ is artificially distorted with the parameter $\theta$ and so as to obtain a distorted image $I_1^{ud}$ equal with the photographed image $I_2$; and an image correcting step (D) for using the parameter $\theta$ to correct the photographed image $I_2$.

2. The image lens distortion correcting method according to claim 1 wherein said parameter $\theta$ comprises a position correction parameter $\theta^u$ for correcting a position, and a distortion correction parameter $\theta^d$ for correcting the distortion.

3. The image lens distortion correcting method according to claim 2, wherein said position correction parameter $\theta^u$ is a first parameter for conversion to an image $I_1^u$ with the corrected position from the image $I_1$, the first conversion parameter is calculate in a least-squares method such that a difference $r=I_1(p)-I_1^u(p+u)$ between a luminance value $I_1(p)$ of a point p in the image $I_1$ and a luminance value $I_1^u(p+u)$ of a point p+u in the image $I_1^u$ corresponding to the point p is minimized entirely on the image $I_1$, and the first parameter thus calculated is used as the position correction parameter $\theta^u$.

4. The image lens distortion correcting method according to claim 3, wherein said distortion correction parameter $\theta^d$ is a second parameter for conversion to the image $I_1^u$ from the distorted image $I_1^{ud}$, the second conversion parameter is calculated in the least-squares method such that a difference $r=I_2(p)-I_1^u(f(p))$ between a luminance value $I_2(p)$ of the point p in the image $I_2$ and a luminance value $I_1^u(f(p))$ of a point $f(p)$ in the image $I_1^u$ corresponding to the point p is minimized entirely on the image $I_2$, and the second parameter thus calculated is used as the distortion correction parameter $\theta^d$.

5. The image lens distortion correcting method according to claim 4, wherein said parameter estimating step (C)

comprises a step of alternately repeatedly using said position correction parameter $\theta_u$ and said distortion correction parameter $\theta^d$ to calculate the parameter $\theta$.

6. The image lens distortion correcting method according to claim 1, wherein said parameter $\theta$ is a parameter for conversion to the image $I_1{}^{ud}$ from the image $I_1$, the conversion parameter is calculated in a least-squares method by using an implicit function theorem such that a difference $r=I_1(p)-I_2(d(p+u(p)))$ between a luminance value $I_1(p)$ of a point p in the image $I_1$ and a luminance value $I_2(d(p+u(p)))$ of a point $d(p+u(p))$ in the image $I_2$ corresponding to the point p is minimized entirely on the image $I_1$, and the conversion parameter thus calculated is used as the parameter $\theta$.

7. The image lens distortion correcting method according to claim 4, wherein said image correcting step (D) comprises a step of using the calculated distortion correction parameter $\theta^d$ to correct the photographed image $I_2$.

8. An image lens distortion correcting method comprising the steps of:

(a) printing a prepared calibration pattern image $I_1$ in a computer;

(b) photographing the printed image $I_1$ with a camera having a lens distortion to obtain a distorted photographed image $I_2$ in the computer;

(c) calculating a parameter $\theta$ such that the image $I_1$ is artificially distorted with the parameter $\theta$ so as to obtain a distorted image $I_1{}^{ud}$ equal with the photographed image $I_2$; and (d) using the calculated parameter $\theta$ to correct the photographed image $I_2$.

9. An image lens distortion correcting method according to claim 8, wherein said parameter $\theta$ comprises a position correction parameter $\theta''$ for correcting a position, and a distortion correction parameter $\theta_d$ for correcting distortion.

10. An image lens distortion correcting method according to claim 9, wherein said position correction parameter $\theta''$ is a first parameter for conversion to an image $I_1''$ with the corrected position from the image $I_1$, the first conversion parameter is calculated in a least-squares method such that a difference $r=I_1(p)-I_1''(p+u)$ between a luminance value $I_1(p)$ of a point p in the image $I_1$ and a luminance value $I_1''(p+u)$ of a point $p+u$ in the image $I_1''$, corresponding to the point p, is minimized entirely on the image $I_1$, and the first conversion parameter thus calculated is used as the position correction parameter $\theta''$.

11. An image lens distortion correcting method according to claim 10, wherein said distortion correction parameter $\theta^d$ is a second parameter for conversion to the image $I_1''$ from the distorted image $I_1{}^{ud}$, the second conversion parameter is calculated in the least-squares method such that a difference $r=I_2(p)-I_1''(f(p))$ between a luminance value $I_2(p)$ of the point p in the image $I_2$ and a luminance value $I_1''(f(p))$ of a point $f(p)$ in the image $I_1''$, corresponding to the point p, is minimized entirely on the image $I_2$, and the second conversion parameter thus calculated is used as the distortion correction parameter $\theta^d$.

12. An image lens distortion correcting method according to claim 11, wherein calculation of the parameter $\theta$ comprises alternately repeatedly using said position correction parameter $\theta''$ and said distortion correction parameter $\theta^d$ to calculate the parameter $\theta$.

13. An image lens distortion correcting method according to claim 8, wherein said parameter $\theta$ is a parameter for conversion to the image $I_1{}^{ud}$ from the image $I_1$ that is calculated in a least-squares method by using an implicit function theorem such that a difference $r=I_1(p)-{}_2(d(p+u(p)))$ between a luminance value $I_1(p)$ of a point p in the image $I_1$ and a luminance value $I_2(d(p+u(p)))$ of a point $d(p+u(p))$ in the image $I_2$, corresponding to the point p, is minimized entirely on the image $I_1$, and the parameter for conversion to the image $I_1{}^{ud}$ from the image $I_1$ thus calculated is used as the parameter $\theta$.

14. The image lens distortion correcting method according to claim 11, wherein the calculated distortion correction parameter $\theta^d$ is used to correct the photographed image $I_2$.

15. The image lens distortion correcting method according to claim 9, wherein said distortion correction parameter $\theta^d$ is a five parameter distortion comprising $k_1$, $k_2$, $c_x$, $c_y$, and $s_x$, where $k_1$ and $k_2$ are distortion parameters, $c_x$ and $c_y$ represent an image center coordinate, and $s_x$ is a ratio of pixel width to pixel height.

16. The image lens distortion correcting method according to claim 15, wherein said position correction parameter $\theta''$ is an eight parameter displacement comprising $\theta_1''$, $\theta_2''$, $\theta_3''$, $\theta_4''$, $\theta_5''$, $\theta_6''$, $\theta_7''$, and $\theta_8''$.

* * * * *